US006490271B1

(12) United States Patent
Erjanne

(10) Patent No.: US 6,490,271 B1
(45) Date of Patent: Dec. 3, 2002

(54) METHOD AND APPARATUS FOR DYNAMIC RADIO RESOURCE CONTROLLING

(75) Inventor: Juha Erjanne, Tampere (FI)

(73) Assignee: Nokia Mobile Phones, Espoo (FI)

( * ) Notice: Subject to any disclaimer, the term of this patent is extended or adjusted under 35 U.S.C. 154(b) by 0 days.

(21) Appl. No.: 09/396,665

(22) Filed: Sep. 15, 1999

(30) Foreign Application Priority Data

Sep. 16, 1998 (FI) .................................................. 982002

(51) Int. Cl.⁷ .............................................. H04B 7/212
(52) U.S. Cl. ...................... 370/347; 370/329; 370/337; 370/348; 455/450
(58) Field of Search ................................ 370/328, 329, 370/337, 347, 348; 455/450

(56) References Cited

U.S. PATENT DOCUMENTS

| | | | |
|---|---|---|---|
| 5,793,744 A | 8/1998 | Kanerva et al. | 370/209 |
| 5,859,843 A | 1/1999 | Honkasalo et al. | 370/342 |
| 5,920,545 A * | 7/1999 | Rasanen et al. | 370/232 |
| 6,172,968 B1 * | 1/2001 | Rasanen | 370/329 |
| 6,181,686 B1 * | 1/2001 | Hamalainen et al. | 370/347 |
| 6,359,904 B1 * | 3/2002 | Hamalainen et al. | 370/469 |

FOREIGN PATENT DOCUMENTS

| | | |
|---|---|---|
| WO | WO 96/36146 | 11/1996 |
| WO | WO 97/22196 | 6/1997 |

OTHER PUBLICATIONS

Finnish Office Action.

* cited by examiner

Primary Examiner—Edward F. Urban
Assistant Examiner—Temica M. Davis
(74) Attorney, Agent, or Firm—Perman & Green, LLP

(57) ABSTRACT

A solution for controlling data transfer over the air interface is introduced. Information is transceived over a first interface and a second interface, the first interface being the air interface. A property of the data flow through the first interface is monitored for deriving a reference value for the monitored property of the data flow, at least one threshold value (T1) for the monitored property is provided; and the derived reference value is compared to the threshold value (T1). As a response to a certain relation of said reference number and said threshold value, a request for radio resource modification is initiated.

10 Claims, 4 Drawing Sheets

METHOD AND APPARATUS FOR DYNAMIC RADIO RESOURCE CONTROLLING

FIELD OF THE INVENTION

The present invention relates to telecommunication, and especially to a method mobile station and inter-working unit for dynamic radio capacity controlling. The mobile station comprises a radio unit for transceiving data over an air interface, a data interface unit for transceiving data to and from the radio unit, and a control unit for controlling the operation of the radio unit and the interface unit. The method comprises the steps of transceiving information over a first interface and transceiving information over a second interface, the first interface being the air interface. The inter-working unit comprises a data interface unit connected to a radio network unit communicating with at least one mobile station over an air interface, and a control unit for controlling the operation of the data interface unit unit.

BACKGROUND OF THE INVENTION

Many existing digital wireless or mobile telephone networks make use of time division multiple access (TDMA) to share out radio resources between a number of mobile stations and between a number of channels. For example, in the European Telecommunications Standards Institute (ETSI) GSM standard, a given frequency band is divided in the time domain into a succession of frames, known as TDMA (Time Division Multiplexed Access) frames. The length of a TDMA frame is 4.615 ms. Each TDMA frame is in turn divided into eight consecutive slots of equal duration. In the conventional circuit switched transmission mode, when a call is initiated, a full rate bi-directional traffic channel (TCH/F) is defined for that call by reserving two time slots (1 to 8), in each of a succession of TDMA frames, for the duration of the call. One of these slots provides the downlink from the base station (BS) to the mobile station (MS) whilst the other provides the uplink.

The circuit switched transmission mode in GSM provides for a data transmission rate of 9.6 kbps. However, due to the demand for higher transmission rates, a set of GSM enhancements known as GSM Phase 2+ have been specified by ETSI. One of the main features of GSM Phase 2+ is known as High Speed Circuit Switched Data (HSCSD—specified in GSM 02.34 and GSM 03.34) which achieves an increased data transmission rate by using more than one TCH/F for a single connection (i.e. effectively reserving two or more consecutive time slots in each TDMA frame).

GSM Phase 2+ also specifies (see for example GSM 01.60, 02.60, 03.60, and 03.64) a new feature known as General Packet Radio Service (GPRS). GPRS provides for the dynamic allocation of radio resources, with the allocation for uplink and downlink communications being made separately and independently of each other. That is to say that a time slot is allocated to a particular MS to BSS link only when there is data to be transmitted. The unnecessary reservation of a TCH/F, when there is no data to be transmitted, is thus avoided. In addition, a high-speed packet switched transmission channel may be provided by assigning two or more slots of a TDMA frame to a single MS.

In GSM HSCSD non-transparent connection mode the user can (if the MS supports this feature) request service level up- or downgrading, i.e. request more or less time slots to be allocated for a connection. Provided that the feature is requested in the set-up of a call, service level up- and downgrading is possible during an ongoing call. For example, when setting up a connection to an Internet Service Provider (ISP), the login and authorisation procedures do not require a lot of transmission capacity and could therefore be managed with one time slot connection. When the connection is established and a large file or a www-page (World Wide Web) containing graphics is being downloaded, more transmission capacity is needed. When the file or the www-page are downloaded and the user is reading the information, the need for capacity is not that big anymore, and a small number of time slots are needed.

In GPRS, a Temporary Block Flow (TBF) is generally initiated for delivering packet data units between the MS and the network. For each temporary flow, the need for resources is negotiated, and immediately after the flow, the resource is released for the use of traffic to and from other MSs. GPRS comprises two allocation modes, a fixed allocation and a dynamic allocation. In the fixed allocation a detailed fixed uplink resource is allocated for the MS, and an option for renegotiation of the radio resource during TBF is also defined.

The advantage of using a correct amount of capacity, i.e. correct number of time slots at each time draws from the fact that the user pays for the connection depending on the amount of time slots used. The less capacity is used, i.e. the less time slots are wasted, and the less the user has to pay. In addition, this approach is advantageous also with respect to the network, since the same resources can be used to facilitate services for a remarkably larger number of users.

However, according to the present system definitions, to facilitate such a feature of up- or downgrading in service level, the application running in the MS must be adapted to support this feature. This means that for example, a www-browser or an email application in the MS must be adapted to recognise that the connection used is a GSM connection employing multiple time slots, and that service level up- and downgrading is supported by the mobile. So far no such applications exist, and even if some such applications were created, mobile subscribers would always be limited to those few adapted applications available.

SUMMARY OF THE INVENTION

According to the first aspect of the invention the mobile station is characterized by its control unit being adapted to monitor a property of a data flow through the interface unit for deriving a reference value for the monitored property of the data flow; said control unit being provided with at least one threshold value for the monitored property; and said control unit being adapted to compare the derived reference value with the threshold value, and being adapted, as a response to a certain relation of said reference number and said threshold value, to initiate a request for radio resource modification.

In the solution according to the invention, the user data to be transmitted over the air interface is monitored, and based on the properties of this data e.g. the number of time slots allocated for the connection is controlled. Consequently, the data processing entity connected to the MS and running the applications does not have to be involved with the control of the radio resource used for the connection, and modifications to the applications in order to support this enhanced use of radio resource become unnecessary. The present invention enables the user to easily benefit from the dynamic nature of the data link and reduces the need for special application software which would have to be tailored for mobile communication environment in order to facilitate utilisation of available dynamic multi-slot features.

In the later embodiments of the invention the mobile station monitors the amount of the transmitted data, or the contents of the data frames transmitted in the physical layer level. According to the invention, certain criteria will be set for the properties of the data, and whenever said criteria are met, a request for service level modification is initiated by the mobile station.

According to a second aspect of the invention an inter-working unit of a mobile system supporting high speed circuit switched data transmission is introduced. The inter-working unit comprises a data interface unit (IU) connected to a radio network unit (BSC, BTS) communicating with at least one mobile station over an air interface, and a control unit (CPU) for controlling the operation of the data interface unit unit. The inter-working unit is characterized by said control unit being adapted to monitor a property of a data flow through the interface unit for deriving a reference value for the monitored property of the data flow; said control unit being provided with at least one threshold value for the monitored property; said control unit being adapted to compare the derived reference value with the threshold value, and being adapted, as a response a certain relation of said reference number and said threshold value, to initiate a request for radio resource modification.

According to a third aspect of the invention, a method for controlling data transfer over the air interface is presented. The method comprises transceiving information over a first interface and transceiving information over a second interface, the first interface being the air interface. The method is characterized by monitoring a property of the data flow through the first interface for deriving a reference value for the monitored property of the data flow; providing at least one threshold value for the monitored property; comparing the derived reference value to the threshold value; and initiating, as a response to a certain relation of said reference number and said threshold value, a request for radio resource modification.

BRIEF DESCRIPTION OF THE DRAWINGS

For a better understanding of the invention and in order to show how the same may be carried into effect reference will now be made, by way of example, to the accompanying drawings, in which.

DETAILED DESCRIPTION

The invention will, by way of an example, be described in connection with GSM (Global System for Mobile Telecommunications) system using the terms and elements traditionally appearing in this context. Further embodiments in functionally equivalent mobile communication system environments are naturally possible. Among the preferred systems are, for example, GSM derivatives, like DCS (Digital Cellular System for 1800 MHz) and PCS (Personal Communications Service for 1900 MHz).

Figure 1:
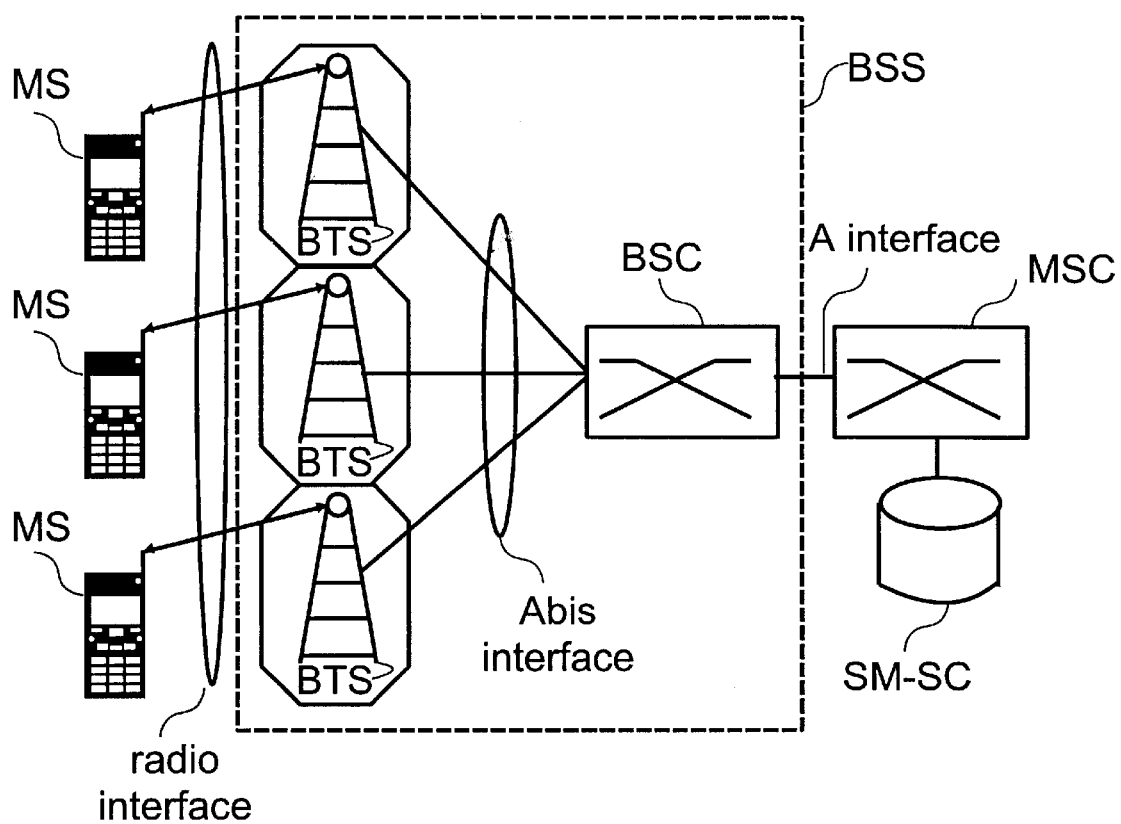
FIG. 1 illustrates the basic elements of the GSM system (state of the art)

FIG. 1 illustrates the basic elements of the GSM system. Mobile stations MS are in connection with base stations BTS using radio communication. The base stations BTS are further, through a so-called Abis interface, connected to a base station controller BSC, which controls and manages several base stations. The entity formed by several base stations BTS and a single base station controller BSC controlling them are called a base station sub-system BSS. Particularly, the base station controller BSC manages radio-communication channels, as well as handovers. On the other hand, the base station controller BSC is, through the so-called A interface, in connection with a mobile services switching centre (MSC), which co-ordinates the establishment of connections to and from mobile stations. Through the mobile services switching centre MSC, a connection can further be established to a subscriber not operating under the mobile communication network.

A set of GSM enhancements specified by European Telecommunications Standards Institute (ETSI) is called ETSI Phase 2+. One of the main work items in phase 2+ is High Speed Circuit Switched Data (HSCSD). HSCSD is an enhancement of the current circuit switched GSM data services to cover higher user rates than 9.6 kbps. The architecture of the HSCSD service is based on the physical layer of the current data services. The increased data rate is achieved by using a combination of more than one full traffic channel (TCH/F) for a single connection.

In the transparent data transmission mode the maximum HSCSD data rate is 64 kpbs using bit transparent protocols. In non-transparent mode the maximum data rate is 38.4 kpbs achieved by using a combination of four TCH/F9.6 channels. After the standardisation of the 14.4 kbps channel coding is completed, the maximum non-transparent data rate is increased to 57.6 kpbs. The effective user data rate of the non-transparent HSCSD data service may be further increased by using GSM data compression that is based on V.42bis algorithm. This compression algorithm increases the effective user data rate to between two and four times the physical user data rate.

Non-transparent mode of HSCSD is realised by modifying the RLP (Radio Link Protocol) and L2R (Layer 2 Relaying ) functions to support multiple parallel traffic channels (TCH/F) instead of only one TCH/F. In addition the RLP frame numbering is increased to accommodate the enlarged data transmission rate. More detailed description of the RLP and L2R is found in ETSI GSM Specifications GMS 04.22 and GSM 07.02 and GSM 07.03.

Figure 2:
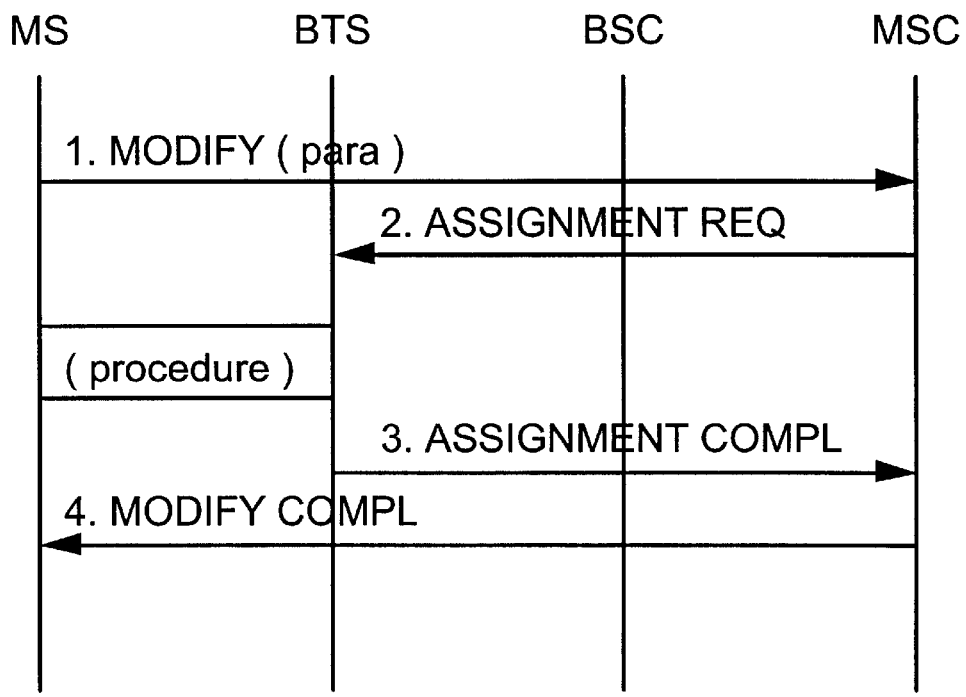
FIG. 2 illustrates the signalling associated with the user initiated service level up- and downgrading procedure (state of the art)

During a HSCSD call the user may request, if so indicated in the call set-up, the network to change the current maximum number of traffic channels and air interface user rate parameters. The user initiated services up- and downgrading is applicable only in non-transparent mode connections. FIG. 2 illustrates the signalling associated with the user initiated service level up- and downgrading procedure. The user will initiate the procedure with a signal 2.1 comprising the new parameters para. If the network allows the modification, the resulting new parameters are forwarded to the BSC (signal 2.2) and the radio interface resources may be adjusted accordingly. The resource upgrading and downgrading is done separately from the change in HSCSD parameters. However, if a contradiction between the new parameters and the used air interface resources exists, the resource downgrading may be needed before the network acknowledges the new parameters. When the procedure is finished, the BSC will acknowledge it to the MSC (signal 2.3) and the MSC will indicate the completion of the modification to the MS (signal 2.4).

Figure 7:
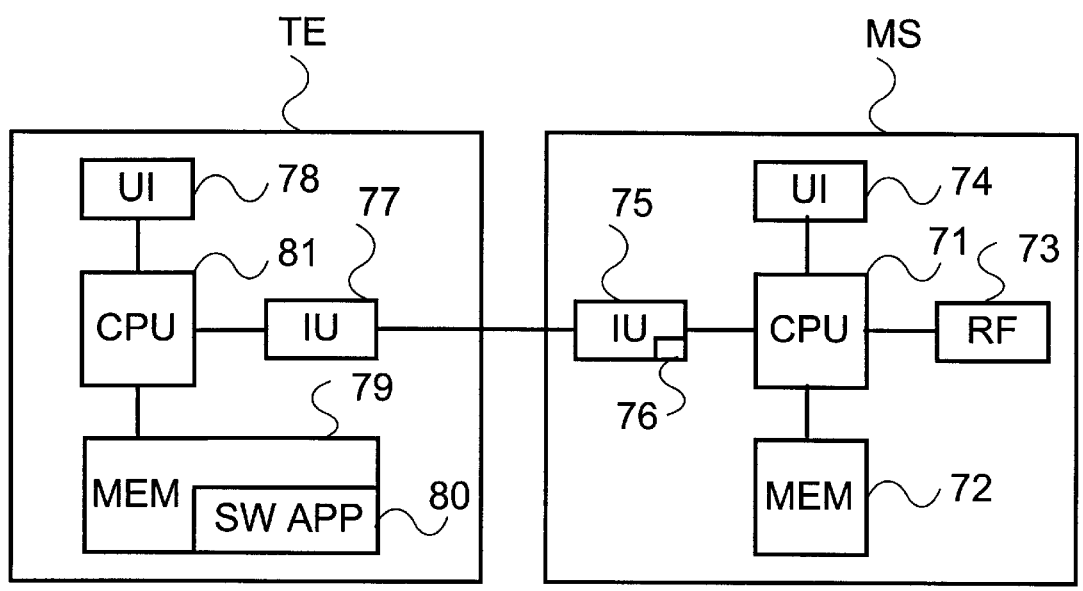
FIG. 7 illustrates the functions of a cellular GSM phone and the procedure of data transfer therein (state of the art)

In the system according to the embodiment of the invention, the mobile station monitors the data flow to be transferred over the air interface, and based on the monitoring results intelligently controls the number of the time slots used for the connection. In the following, some embodiments of the invention with different ways of monitoring are discussed. The monitoring can be implemented by e.g. monitoring the amount of RLP data frames transmitted over the data link, or monitoring the amount of data in data link transmission buffers. Practically any buffer can be chosen for monitoring, but here a GSM solution where L2R buffers are used is presented as illustrated in FIG. 7.

In these embodiments the terminal is a GSM handset supporting the HSCSD service and a separate terminal adapter with a PCMCIA interface or a normal V.24 (RS-232) serial interface prior known to a person skilled in the art. Other possible solutions are also available, e.g. an integrated GSM MS containing all needed functionality and a PCMCIA, serial (RS-232), parallel, infrared, or low power RF interface to user terminal. The issue of data terminals will be discussed later in more detail.

Figure 3:
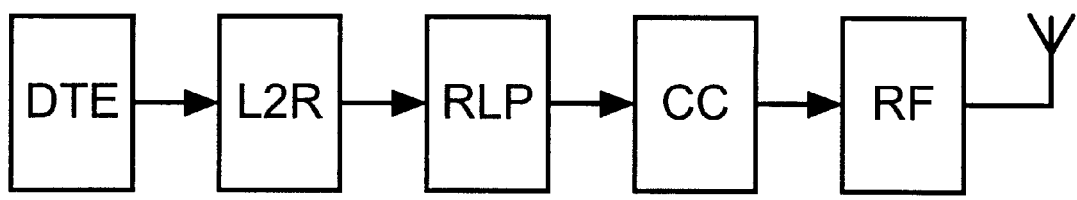
FIG. 3 illustrates the functional elements of the data transfer process in GSM (state of the art)

FIG. 3 illustrates the functional elements of the data transfer process in GSM. Data from the Data Terminal Equipment DTE is processed by Layer 2 Relay function L2R, which provides for the reliable transportation of known, i.e. non transparent, user protocols across the radio interface of a GSM PLMN. The L2R uses the services provided by the Radio Link Protocol (RLP) to transport the non-transparent protocol information between the MS and the network.Provisions exist in the L2R entity to transfer a flow control active condition (sent by its associated DTE) to the other L2R entity. A flow control active condition can take place under a number of circumstances:

end to end flow control (DTE to DTE matter);
  backpressure (buffers filling);
  receive not ready (RLP condition).

Such a mechanism avoids build up of data in buffers, which can be undesirable. The L2R entity, receiving a flow control active condition from its L2R associated DTE, stops sending data to that associated DTE immediately.

The L2R and RLP entities have buffers which may become full to a predetermined threshold for a number of reasons, e.g. severe radio fading, failure or slowness of DTE to react to end-to to-end flow control, or certain RNR conditions. When this predetermined threshold is reached, a flow control active condition is sent to the associated DTE, which is then prevented from sending any data. Subsequently, the flow control inactive condition is sent to the associated DTE when the L2R or RLP entities have indicated that there is sufficient free capacity in their buffers for data flow from the associated DTE to proceed.

Figure 4:
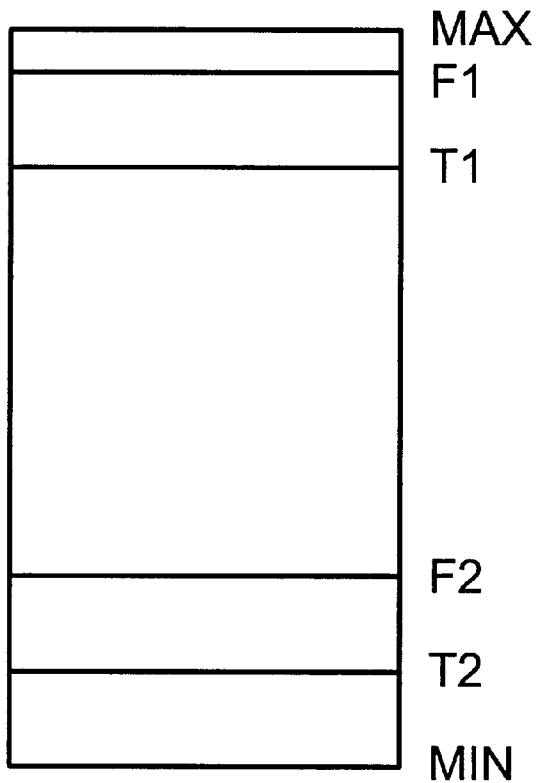
FIG. 4 illustrates different thresholds used in an embodiment of the invention.

Similarly, the decision when to request service level change can be done using threshold values. Substantially two threshold values and a hysteresis region between them are needed to prevent oscillation from upgrading to downgrading and vice versa. When the amount of data in the buffer goes below a chosen lower threshold, service level downgrading is needed, and when the amount of data in the buffer exceeds a chosen higher threshold, service level upgrading is needed. FIG. 4 illustrates different thresholds used in this embodiment. It should be noted that though in this embodiment two thresholds are preferentially used, some effect could also be introduced using only one threshold.

FIG. 4 illustrates a L2R data terminal equipment (DTE) buffer, where the number of transmitted bytes is monitored for flow control purposes in a normal manner. When the buffer is full, the number of bytes is MAX, and when the buffer is empty, the number of bytes is MIN. A flow control threshold F1 (flow control on) defines the number of bytes in the buffer which, when exceeded, triggers the flow control, which stops the DTE from transmitting data to prevent buffer overflow. A flow control threshold F2 (flow control off) is defined so that when the number of bytes in the buffer goes below said threshold, the flow control is deactivated and the DTE is allowed to start transmitting data again.

The thresholds according to the invention are defined bearing in mind the size of the buffer, the speed of the link and how large the hysteresis region is wanted between the thresholds. An upper threshold T1 defines the number of bytes in the buffer which, when exceeded, triggers the MS connected to the DTE to request for a service level upgrade. A lower threshold T2 defines the number of bytes in the buffer which, when gone under, triggers the MS to request for a service level downgrade. T1 can not be higher than F1, because the amount of data in the transmission buffer may never exceed T1 if the flow control prevents the DTE from transmitting data to the MS. T2 is preferably lower than F2 to prevent a situation where service level downgrading would be requested only because the flow control prevents DTE to transmit more data to the MS. The type of flow control used does not have an effect to the method according to the invention.

In operation, when the amount of data in the buffer exceeds T1, the MS will initiate a service level upgrading request. If the amount of data in the buffer exceeds F1, the flow control is activated to prevent buffer overflow. Due to the flow control, the DTE will stop transmitting data to the MS and the MS will continue transmitting data with upgraded service level. Eventually the amount of data in the buffer will decrease and go below F2. At this time, the flow control is deactivated and the DTE will start transmitting again and the transmission will continue in the increased service level. When the DTE has no more data to transmit, the amount of data in the buffer will go below T2 and the MS will initiate a service level downgrading request.

Figure 5:
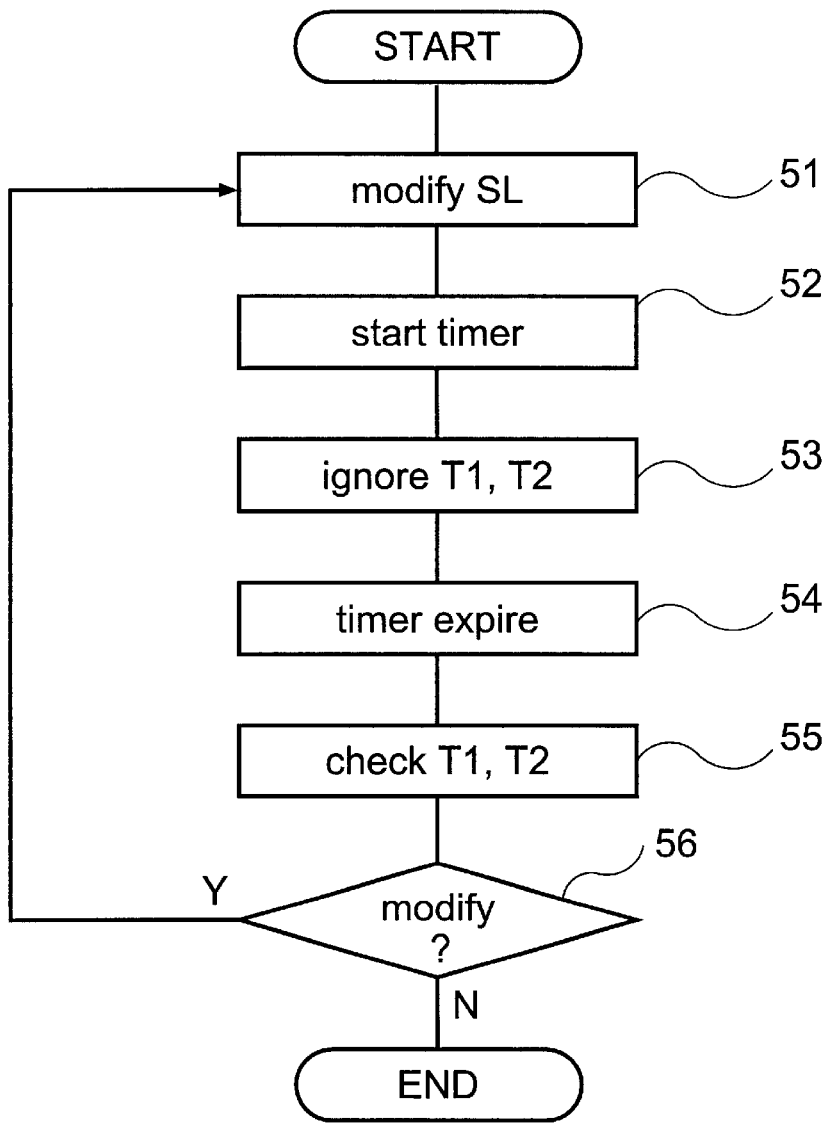
FIG. 5 presents an embodiment of the method according to the invention.

To enable an even more accurate control function, the basic procedure can be supplemented with other control measures. For example, timers can be used, as will be explained here referring to FIG. 5. The first service level change is triggered by the amount of data dropping below T2 or exceeding T1. Initiation of service level modification by an MS (step 51) will trigger a timer (step 52), and while the timer is running, further triggering of service level modification request will be ignored (step 53). When the timer expires (step 54), the mobile checks if the situation requires the service level to be further modified (step 55, 56). For example, say the mobile is transmitting with four time slots, and suddenly the DTE will pause transmission of data. When the amount of data in the buffer drops below T2 the MS requests service level downgrade from the network and a timer is started. If the DTE will not resume transmission, the amount of the data in the buffer will be close to 0 and the number of time slots available is still 3. When the timer expires, the mobile will check again the situation of the buffer and do a further downgrading, if needed. Similar procedure will apply to the case of exceeding the upper threshold T1.

In another embodiment of the invention, the service level decision is based on the ratio between data frames and non-data frames. RLP frame is a sequence of contiguous bits, representing an RLP procedural element, and is of one of following types: U-frame containing unnumbered protocol control information, S frame containing supervisory information in the absence of user information, I+S frame used for information transfer and carrying supervisory information piggyback.

In this embodiment the MS will monitor the amount of I+S frames compared to the total number of frames and compare the derived ratio to threshold value(s) in a similar manner as in earlier embodiment. According to the implementation, either only full data frames or full and partly filled I+S frames can be regarded as data frames. When the ratio of I+S frames will exceed T1, MS will request service level upgrade from the network. The service level downgrade can be defined as earlier, or it can be controlled more accurately to depend on the current number of time slots and the number of time slots after possible downgrading. For example, if the mobile is using currently four time slots, the ratio should drop below 75% for the service level downgrade to be reasonable. If the mobile is about to downgrade from two time slots to one, the ratio should drop below 50% and the amount of transmitted data could still be delivered using that one time slot.

In this embodiment there is no need for such timers for consecutive service level changes as in the embodiment where data buffer monitoring was used. The service level modification can be arranged to take place each time a certain number of frames is received and transmitted, and the frame counter is reset every time a service level modification is requested. Below is given a step-by-step example of how the RLP data frame monitoring works with Windows dial-up networking and a www-browser. An asymmetric HSCSD connection using three time slots in receiving direction and one time slot in transmitting direction is used.

1. Activate 3+1 HSCSD connection and DMC in modem initialisation string with an AT-command, e.g. "AT+CHSN=, 1, 3, 0;+CHDC=1". These commands have the effect that the next data call is set-up only with 1 timeslot, but during the connection 3 timeslots may be requested. Also the DMC feature is activated with +CHDC command.

2. Create a data call using the dial-up networking.

3. The call is set-up with 1+1 timeslots and because the authentication procedure does not need much bandwidth, no service level change happens. The mobile is keeping count of the received and sent I+S frames (data frames) as follows:

TX_FULL_COUNT is incremented by one every time one I+S frame full of data is transmitted TX_FULL_COUNT is decremented by one every time one I+S frame NOT full of data is transmitted TX_NOT_FULL_COUNT is incremented by one every time one I+S frame NOT full of data is transmitted TX_NOT_FULL_COUNT is decremented by one every time one I+S frame full of data is transmitted RX_FULL_COUNT is incremented by one every time one I+S frame full of data is received RX_FULL_COUNT is decremented by one every time one I+S frame NOT full of data is received RX_NOT_FULL_COUNT is incremented by one every time one I+S frame NOT full of data is received RX_NOT_FULL_COUNT is decremented by one every time one I+S frame full of data is received If a counter is already 0, it is not decremented. If a service level change happens, all counters are set to 0.

4. After the login procedure the www-browser starts to load the users home page. This requires a lot of bandwidth, so the RX_FULL_COUNT is incremented as full data frames are received from the network. At the same time, TX_NOT_FULL_COUNT is incremented. But service level upgrading takes precedence over service level downgrading, so when the RX_FULL_COUNT reaches a predetermined level, service level upgrading is requested. The upgrading level is defined by the current amount of receive timeslots and used channel coding. E.g. 100 frames can be used as a threshold value for upgrading, equalling to 2 seconds on 9.6 kbps channel or 4 seconds on 14.4 kbps channel. Of course, different thresholds can be used for different channels. The mobile will the request service level upgrading from the network. All frame counters are set to 0. If the service level upgrading request fails, the counters are also set to 0 and the request is repeated after the threshold is exceeded again.

5. Now the connection is using 2+2 (or 2+1) channel configuration.

6. The home page which is currently being loaded contains heavy graphics, so even 2 timeslots is not enough. RX_FULL_COUNT is incremented and because there are no empty or partially full frames from the network, the RX_FULL_COUNT is not decremented at all.

7. Again the service level upgrading threshold is reached and the mobile requests more timeslots from the network. The network changes the channel configuration to 3+1.

8. After this, even when the upgrading threshold is exceeded the mobile is not allowed to request more timeslots, because in the set-up of the call, a maximum of 3 timeslots were negotiated.

9. The home page has been successfully downloaded and the user is reading the information on the www-page, so there is no need for bandwidth.

10. The mobile is receiving empty or partially full data frames from the network, so RX_FULL_COUNT is decreased until 0 and RX_NOT_FULL_COUNT is increased until a certain level is reached. At the moment 3 timeslots are used, so the amount of traffic needs to drop below ⅔ of the maximum in order to downgrade to 2 timeslots. A threshold of 100 frames is used for downgrading. When RX_NOT_FULL_COUNT reaches 100, service level downgrading is requested from the network. In this situation it would be possible to request either 2 or even 1 timeslot from the network, but in our example, the service level is changed one timeslot at a time.

11. Network changes the channel configuration to 2+2. The user is still reading the web page so there's no need for even 2 timeslots. RX_NOT_FULL_COUNT reaches again the threshold value and the mobile requests service level downgrading from the network.

12. When the user starts downloading a new www page from the network, the upgrading takes place after 100 full data frames have been received from the network.

The DMC works similarly in transmit direction, e.g. when using an e-mail application, where the received e-mails are first retrieved from the network and then the outgoing e-mails are sent.

In GPRS fixed allocation the Packet Fixed Immediate Assignment or Packet Fixed Resource Assignment messages are used to communicate a detailed fixed uplink resource allocation to the MS. The fixed allocation consists of a start frame, slot assignment, and block assignment bitmap representing the assigned blocks per timeslot. The MS waits until the start frame indicated and then transmits radio blocks on those blocks indicated in the block assignment bitmap. If the current allocation is not sufficient, the MS may request additional resources in one of the assigned uplink blocks. In dynamic allocation both the allocations in uplink and downlink directions can be dynamically modified, but substantially the resources are controlled by the network elements.

Figure 6:
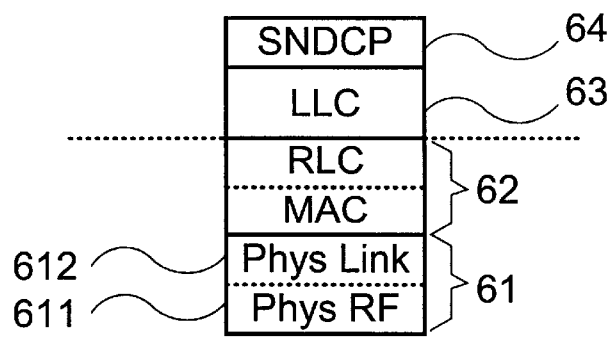
FIG. 6 illustrates the GPRS radio interface (state of the art)

FIG. 6 illustrates the GPRS radio interface that can be modelled as a hierarchy of logical layers with specific functions. The physical layer 61 has been separated into two distinct sub-layers defined by their functions. Physical RF layer 611 performs the modulation of the physical waveforms based on the sequence of bits received from the Physical Link layer 612. The Physical RF layer also demodulates received waveforms into a sequence of bits which are transferred to the Physical Link layer for interpretation. Physical Link layer provides services for information transfer over a physical channel between the MS and the Network. These functions include data unit framing, data coding, and the detection and correction of physical medium transmission errors. The Physical Link layer uses the services of the Physical RF layer.

The lower part of the data link layer 62 is defined by a combination of two functions. The RLC/MAC layer provides services for information transfer over the physical layer of the GPRS radio interface. These functions include backward error correction procedures enabled by the selective retransmission of erroneous blocks. The MAC function arbitrates access to the shared medium between a multitude of MSs and the Network. The RLC/MAC layer uses the services of the Physical Link layer. The layer above RLC/MAC (i.e., LLC 63) uses the services of the RLC/MAC layer on the Um interface. The user of the services provided by the Subnetwork Dependent Convergence Protocol (SNDCP) 64 is already a packet data protocol (PDP) at the Mobile Station (MS). SN-PDUs segmented by the SNDC-protocol are encapsulated into one or several LLC frames.

In this embodiment of the invention, the interface between the MS and the network is arranged to be dynamic and the MS will control and modify the allocations according to the properties of the data flow. As in the HSCSD solution, data flow in the physical Link Layer is monitored, and whenever the traffic increases or decreases over or under set thresholds, the MS is arranged to initiate a request of modification of the radio resource. Accorsdingly, the interface to the application software is constant and no modifications for the application due to the variable transfer rates are needed.

As an example of a configuration, where the invented method can be implemented, a digital cellular phone according to the GSM supporting the HSCSD service, connected to a separate terminal adapter with a PCMCIA interface of a normal V.24 (RS-232) serial interface has been mentioned. The functional modules of a cellular GSM phone are illustrated in the block diagram of FIG. 7.

The structure of the mobile station is by far that of a traditional mobile station earlier known to a person skilled in the art. A Central Processing Unit 71 controls the blocks responsible for the mobile station's different functions: a Memory (MEM) 72, a Radio Frequency block (RF) 73, a User Interface (UI) 74 and an Interface Unit (IU) 75. CPU is typically implemented with one or more functionally interworking microprocessors. The memory preferably comprises a ROM (Read Only Memory), a RAM (Random Access Memory) and is generally supplemented with memory supplied with the SIM User Identification Module. In accordance with its program, the microprocessor uses the RF block 73 for transmitting and receiving messages on the radio path. Communication with the user is managed with by the UI 74, which typically comprises a loudspeaker, a display and a keyboard. The Interface Unit 75 is the link to a data processing entity, and it is controlled by the CPU 71. The IU is also associated with the RLP and L2R protocols comprising a buffer BF 76 for flow control monitoring, as described earlier. The data processing entity may be an integrated data processor or an external data processing equipment.

FIG. 7 also illustrates the functional modules of a data processing entity TE according to the invention. The terminal equipment TE may be for example a Personal Computer prior known from office environment as illustrated in FIG. 7, or a workstation. TE may also be an integral part of the MS (e.g. smartphone) sharing elements such as UI and CPU with the MS. Vice versa, MS may also be integrated in the TE (e.g. card phone). It is appreciated, that even though in FIG. 7 two separate blocks are shown, no restriction to the configuration is implied therewith.

TE substantially comprises an interface unit IU 77 corresponding to the one in MS, to control the interface to the MS. It also comprises a User Interface UI 78 for receiving user commands and outputting information to the user, a memory MEM 79 to store applications SW APP 80 and applications related data, and a processor CPU 81 to control the operations of the TE and to carry out the application procedures.

There exists a plurality of methods to connect the mobile station MS and the data processing entity, all known to a person skilled in the art. One of the methods is to interconnect the devices through interface units IU comprising wired connection, appropriate interconnection interface e.g. a serial port, and supplemented with appropriate interfacing software in the CPUs controlling the operation of the interface units IU. Another method is to use wireless connection in infrared wavelength range or to use low-power radio frequency transceiver units. The new solutions where the MS is integrated in the TE also provide a very feasible platform to the system according to the invention.

When a user wants to run an application in the TE, by means of the UI 77 the required application SW APP 80 is brought onto the UI 77, and on the basis of commands from user input devices the processor CPU 81 retrieves from the memory MEM 79, wherein applications programmably handling the application related information have been stored, the selected application onto the UI 77 or retrieves a service from the telecommunications network as presented above. The application relating to a service is processed in the CPU 81 and whenever a need for sending application related information arises, a command is forwarded to the MS through the IU 77. According to the invention, the CPU 71 of the MS monitors the data flow through IU 75, and as a response to the properties of the data flow in said IU 75, sends a request for radio resource modification to the network and manages the operations of the radio unit RF 73 accordingly.

Figure 8:
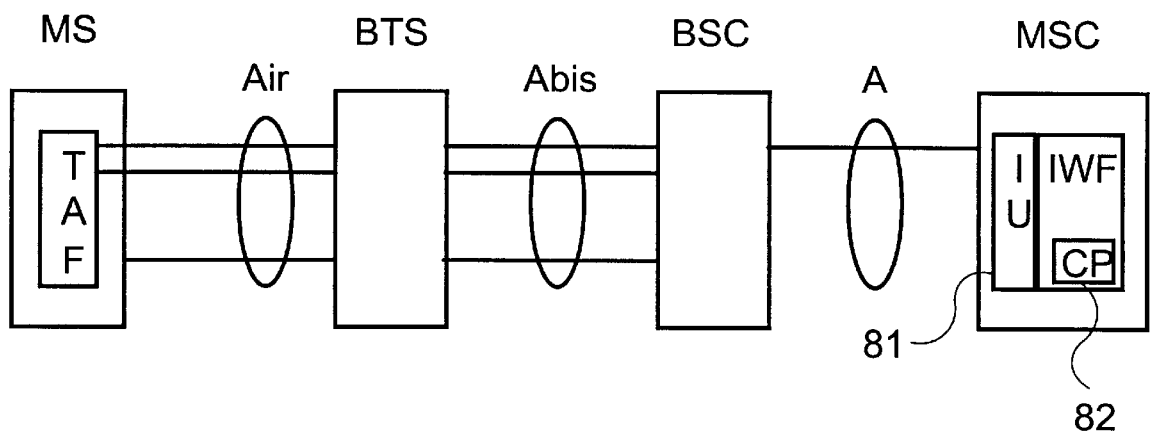
FIG. 8 presents an exemplary configuration of a connection of a mobile station MS and a terminal device according to the invention.

In the circuit switched environment, the method according to the invention is possible to implement also in the network side. FIG. 8 illustrates a more detailed implementation of HSCSD services in the GSM network. In addition to the network elements described in connection of FIG. 1, a new functionality IWF (Inter-Working Function) is introduced in the network side and TAF (Terminal Adapter Function) in a mobile station. The new elements provide the functions of combining and splitting the data into separate data streams which will then be carried via n channels at the radio interface. Once split, the data streams shall be carried by the n full rate traffic channels, called HSCSD channels, as if they were independent of each other, for the purpose of data relay and radio interface error control, until to the point in the network where they are combined.

Since the network entity combined to the MS by RLP is IWF, similar RLP control function as described earlier can be implemented there as well. In such a solution, the IWF is adapted to, according to the invention, monitor the amount or type of traffic frames to be transferred over the air interface, and with similar decision-making as described earlier, initiate a process for radio resource up- or downgrading. IWF is involved with flow control in the same manner as MS, and therefore in a preferred embodiment, such means for monitoring comprise a control unit CPU 82 controlling the communication of the IWU with a plurality of mobile stations through an Interface Unit 81 as illustrated in FIG. 8.

The above is a description of the realization of the invention and its embodiments utilizing examples. It is self evident to a person skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A mobile station, comprising:
    a radio unit (73) for transceiving data over an air interface at a certain transmission rate, a data interface unit (75) for transceiving data to and from the radio unit, and a control unit (71) for controlling the operation of the radio unit and the interface unit;
    characterized by:
    said control unit (71) being adapted to monitor a property of a data flow through the interface unit (75) for deriving a reference value for the monitored property of the data flow;
    said control unit (71) being provided with at least one threshold value (T1) for the monitored property;
    said control unit (71) being adapted to compare the derived reference value with the threshold value (T1), and being adapted, as a response to the comparison giving a certain relation of said reference number and said threshold value, to initiate a request for addition or reduction of reserved radio resources for modifying the transmission rate.

2. A mobile station as claimed in claim 1, characterized by the threshold value being a first threshold (T1) value defining an upper limit for the monitored property, whereby the request for radio resource upgrade is triggered by the reference value exceeding the first threshold value.

3. A mobile station as claimed in claim 2, characterized by said control unit being further provided with a second threshold (T2) value defining a lower limit for a value, whereby the request for radio resource downgrade is triggered by the sample value going below the second threshold value.

4. A mobile station as claimed in claim 1, characterized by the amount of radio resource being defined by the amount of TDMA slots.

5. A mobile station as claimed in claim 1, characterized by said interface unit of the mobile station (75) comprising a L2R buffer for buffering the data flow between the data processing element (TE) and the radio unit (73).

6. A mobile station as claimed in claim 1, characterized by said monitoring comprising counting of data frames currently in the L2R buffer, and said reference value equaling to the current amount of data frames in the monitored L2R buffer.

7. A mobile station as claimed in claim 1, characterized by said monitoring comprising counting the quotient of the I+S frames of the amount of total frames currently in the L2R buffer, and said reference value equaling current quotient.

8. An inter-working unit (IWU) of a mobile system supporting high speed circuit switched data transmission, comprising:
    a data interface unit (81) connected to a radio network unit (BSC, BTS) communicating with at least one mobile station over an air interface at a certain transmission rate, and a control unit (82) for controlling the operation of the data interface unit;
    characterized by
    said control unit (82) being adapted to monitor a property of a data flow through the interface unit (81) for deriving a reference value for the monitored property of the data flow;
    said control unit (82) being provided with at least one threshold value (Tl) for the monitored property;
    said control unit (82) being adapted to compare the derived reference value with the threshold value (Tl), and being adapted, as a response to the comparison giving a certain relation of said reference number and said threshold value, to initiate a request for addition or reduction of reserved radio resources for modifying the transmission rate.

9. An inter-working unit as claimed in claim 8, characterized by said system supporting GSM HSCSD service.

10. A method for controlling data transfer over an air interface comprising transceiving information over a first interface at a certain transmission rate and transceiving information over a second interface, the first interface being the air interface comprising the steps of;
    monitoring a property of the data flow through the first interface for deriving a reference value for the monitored property of the data flow;
    providing at least one threshold value (T1) for the monitored property;
    comparing the derived reference value to the threshold value (T1); and
    initiating, as a response to the comparison giving a certain relation of said reference number and said threshold value, a request for addition or reduction of reserved radio resources for modifying the transmission rate.

* * * * *